(12) United States Patent
Chen

(10) Patent No.: US 11,909,325 B2
(45) Date of Patent: Feb. 20, 2024

(54) CIRCUIT FOR GENERATING A DYNAMIC DRAIN-SOURCE VOLTAGE THRESHOLD AND METHOD THEREOF

(71) Applicant: Chengdu Monolithic Power Systems Co., Ltd., Chengdu (CN)

(72) Inventor: Yuedong Chen, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 309 days.

(21) Appl. No.: 17/521,000

(22) Filed: Nov. 8, 2021

(65) Prior Publication Data

US 2022/0158565 A1 May 19, 2022

(30) Foreign Application Priority Data

Nov. 17, 2020 (CN) .......................... 202011286140.1

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 1/0025* (2021.05)

(58) Field of Classification Search
CPC ....................... H02M 1/0025; H02M 3/33592
See application file for complete search history.

(56) References Cited

U.S. PATENT DOCUMENTS

| | | | |
|---|---|---|---|
| 8,102,680 B2 | 1/2012 | Ren et al. | |
| 8,976,547 B2 | 3/2015 | Ren et al. | |
| 10,432,104 B2 | 10/2019 | Li et al. | |
| 10,784,791 B2 | 9/2020 | Feng et al. | |
| 10,879,810 B2 | 12/2020 | Zhang | |
| 10,951,124 B2 | 3/2021 | Li et al. | |
| 2013/0108304 A1* | 5/2013 | Hayasaki | H02M 3/33592 399/88 |
| 2017/0353099 A1* | 12/2017 | Yang | H02M 3/33507 |
| 2018/0091040 A1* | 3/2018 | Wong | H02M 3/33592 |
| 2019/0020282 A1* | 1/2019 | Li | H02M 3/33592 |
| 2020/0161985 A1* | 5/2020 | Li | H02M 3/33592 |
| 2020/0204080 A1* | 6/2020 | Zhang | H02M 3/33592 |
| 2020/0389082 A1 | 12/2020 | Feng et al. | |

* cited by examiner

*Primary Examiner* — Kyle J Moody
*Assistant Examiner* — Jye-June Lee
(74) *Attorney, Agent, or Firm* — Perkins Coie LLP

(57) ABSTRACT

A synchronous rectifier control circuit, used with a synchronous rectification circuit having a primary switch and a synchronous rectifier, having: a drain-source threshold setting circuit, configured to provide a dynamic drain-source voltage threshold based on a drain-source voltage across the synchronous rectifier; a primary switch detecting circuit, configured to provide a primary switch state indicating signal based on a comparison result of the drain-source voltage and the dynamic drain-source voltage threshold; and an on-control circuit, configured to provide a synchronous on signal to turn on the synchronous rectifier when the drain-source voltage decreases to the turn-on threshold, on the premise that the primary switch state indicating signal indicates an on state of the primary switch.

19 Claims, 5 Drawing Sheets

CIRCUIT FOR GENERATING A DYNAMIC DRAIN-SOURCE VOLTAGE THRESHOLD AND METHOD THEREOF

CROSS-REFERENCE TO RELATED APPLICATIONS

This application claims priority to and the benefit of Chinese Patent Application No. 202011286140.1, filed on Nov. 17, 2020, which is incorporated herein by reference in its entirety.

FIELD

The present invention relates generally to electronic circuits, and more particularly but not exclusively to a control circuit for a synchronous rectifier of a synchronous rectification circuit and the method thereof.

BACKGROUND

Synchronous rectification circuits are widely adopted by notebook power adapters, wireless communication equipment, LCD screen power management, Ethernet power supply and other applications requiring high power conversion efficiency. A typical synchronous rectification circuit 10 having a flyback topology is shown in FIG. 1. As can be seen from FIG. 1, the synchronous rectification circuit 10 comprises a transformer T1 having a primary winding and a secondary winding. Different from the asynchronous rectification circuit, a controllable switch P2 (a synchronous rectifier) instead of a diode, is coupled to the secondary winding, to be turned on and off alternately with a primary switch P1 to convert an input voltage into an output voltage with required voltage level in FIG. 1.

The synchronous rectification circuit 10 turns on and off the synchronous rectifier P2 according to a voltage VDS across the synchronous rectifier P2, i.e., a drain-source voltage of the synchronous rectifier P2. In practical applications, the drain-source voltage VDS varies with the circuit parameters (such as input voltage), which makes it difficult to set a precise threshold for the drain-source voltage for determining the on and off operation of the synchronous rectifier.

SUMMARY

It is an object of the present invention to provide a dynamic drain-source voltage threshold which varies with a drain-source voltage of a synchronous rectifier, to be compared with the drain-source voltage, thus to determine an on state of a primary switch of a synchronous rectification circuit, which is set to be a premise before turning on the synchronous rectifier.

In accomplishing the above and other objects, there has been provided, in accordance with an embodiment of the present invention, a drain-source threshold setting circuit to control a synchronous rectifier, comprising: a capacitor; an amplifier, configured to receive a drain-source voltage across the synchronous rectifier and a capacitor voltage across the capacitor, and to provide a first current to charge the capacitor based on an amplified error between the drain-source voltage and the capacitor voltage; a buffer circuit, configured to receive the capacitor voltage, and to provide a dynamic drain-source voltage threshold based on the capacitor voltage; and a discharging circuit, configured to receive the drain-source voltage and the dynamic drain-source voltage threshold, and to discharge the capacitor based on a comparison result of the drain-source voltage and the dynamic drain-source voltage threshold.

In accomplishing the above and other objects, there has been provided, in accordance with an embodiment of the present invention, a synchronous rectifier control circuit, used with a synchronous rectification circuit having a primary switch and a synchronous rectifier, comprising: a drain-source threshold setting circuit, configured to receive a drain-source voltage across the synchronous rectifier, and to provide a dynamic drain-source voltage threshold based on the drain-source voltage; a primary switch detecting circuit, configured to receive the drain-source voltage and the dynamic drain-source voltage threshold, and to provide a primary switch state indicating signal based on a comparison result of the drain-source voltage and the dynamic drain-source voltage threshold; and an on-control circuit, configured to receive the primary switch state indicating signal, the drain-source voltage and a turn-on threshold, on the premise that the primary switch state indicating signal indicates an on state of the primary switch, the on-control circuit provides a synchronous on signal to turn on the synchronous rectifier when the drain-source voltage decreases to the turn-on threshold.

In accomplishing the above and other objects, there has been provided, in accordance with an embodiment of the present invention, a control method for controlling a synchronous rectifier of a synchronous rectification circuit, wherein the synchronous rectification circuit having a primary switch, the control method comprising: generating a dynamic drain-source voltage threshold based on the drain-source voltage; determining if the primary switch is in an on state by comparing the drain-source voltage with the dynamic drain-source voltage threshold; detecting if the drain-source voltage is lower than a turn-on threshold; and after the drain-source voltage reaches the dynamic drain-source voltage threshold, turning on the synchronous rectifier when the drain-source voltage is lower than the turn-on threshold.

The control circuit and the control method of the synchronous rectification circuit provided by the present invention control the on operation of the synchronous rectifier accurately, which avoids mistrigger of the synchronous rectifier and improves circuit reliability.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art would recognize, however, that the invention can be practiced without one or more of the specific details. In other instances, well-known details are not shown or described to avoid obscuring aspects of the invention.

Figure 1:
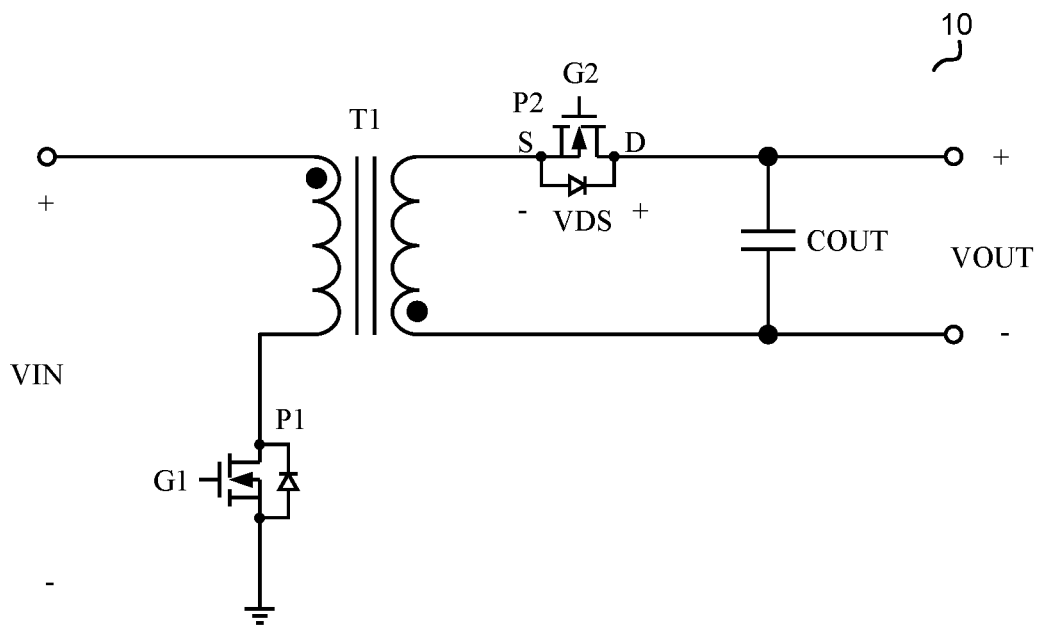
FIG. 1 shows a prior art synchronous rectification circuit 10.
Figure 2:
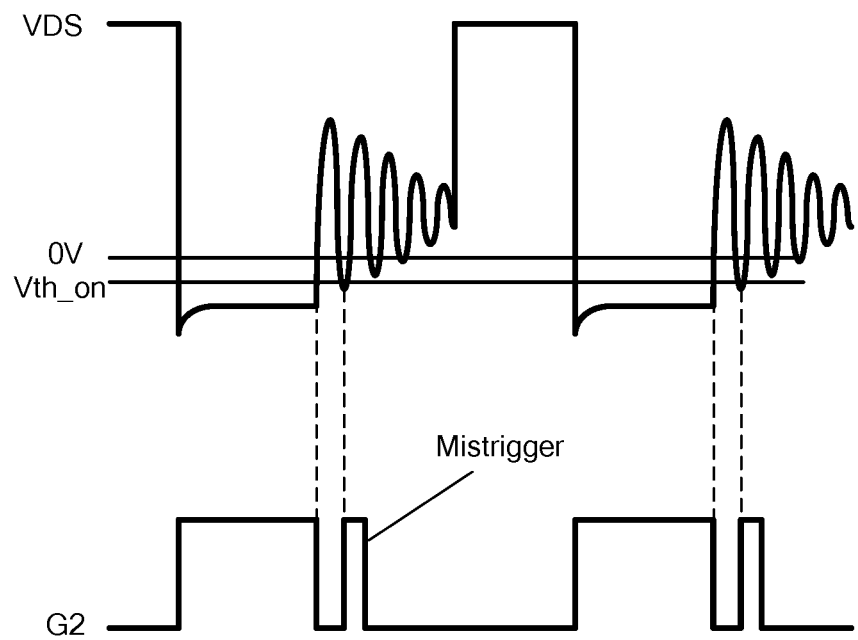
FIG. 2 schematically shows waveforms of a prior art drain-source voltage VDS and a prior art control signal G2 of the synchronous rectifier P2.

FIG. 2 schematically shows waveforms of the prior art drain-source voltage VDS and a prior art control signal G2 of the synchronous rectifier P2 in FIG. 1. As shown in FIG. 2, the synchronous rectification circuit 10 turns on the synchronous rectifier P2 when the drain-source voltage VDS decreases to a turn-on threshold Vth_on. However, the drain-source voltage VDS rings after the synchronous rectifier P2 is turned off. When the drain-source voltage VDS rings to the turn-on threshold Vth_on, the synchronous rectifier P2 will be mistriggered. In prior art, the slew rate of the drain-source voltage VDS is detected and is determined to be higher than a preset threshold before turning on the synchronous rectifier P2 to avoid mistrigger. However, as the switching frequency of the synchronous rectifier P2 increases, the slew rate of the drain-source voltage VDS during oscillation is getting closer and closer to the slew rate of the drain-source voltage VDS during normal switching, which means the rings can not be distinguished by detecting the slew rate of the drain-source voltage VDS, and thus the mistrigger can not be avoided.

Figure 3:
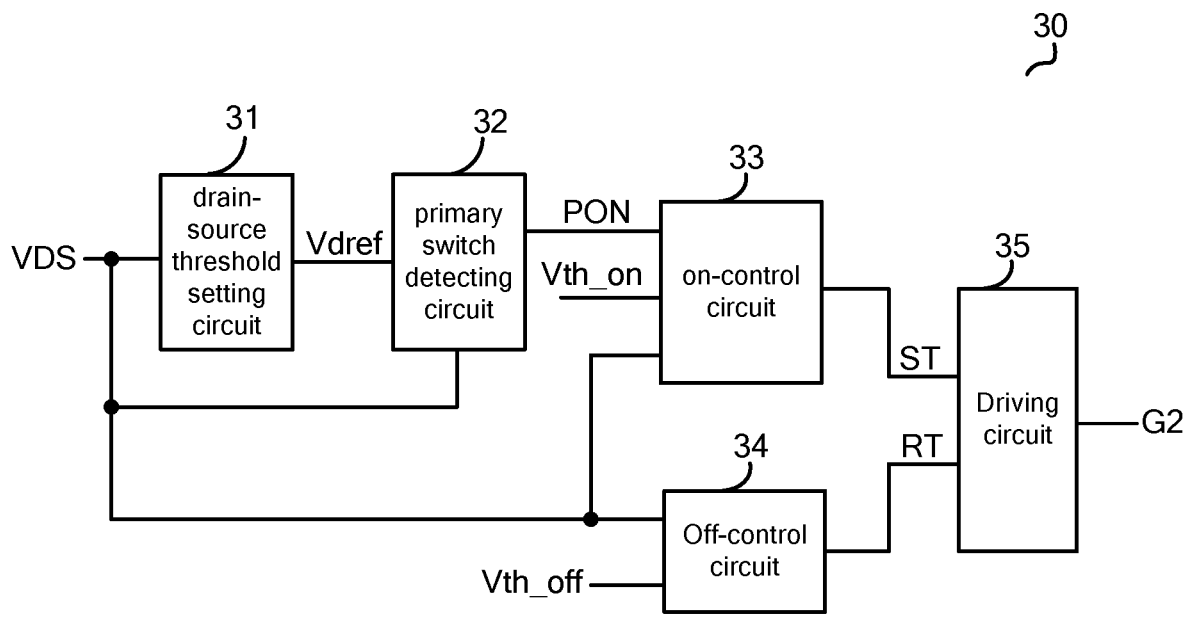
FIG. 3 schematically shows a synchronous rectifier control circuit 30 in accordance with an embodiment of the present invention.

FIG. 3 schematically shows a synchronous rectifier control circuit 30 in accordance with an embodiment of the present invention. The synchronous rectifier control circuit 30 could be used with the synchronous rectification circuit 10 in FIG. 1. As shown in FIG. 3, the synchronous rectifier control circuit 30 comprises: a drain-source threshold setting circuit 31, configured to receive the drain-source voltage VDS, and to provide a dynamic drain-source voltage threshold Vdref based on the drain-source voltage VDS; a primary switch detecting circuit 32, configured to receive the drain-source voltage VDS and the dynamic drain-source voltage threshold Vdref, and to provide a primary switch state indicating signal PON based on a comparison result of the drain-source voltage VDS and the dynamic drain-source voltage threshold Vdref; and an on-control circuit 33, configured to receive the primary switch state indicating signal PON, the drain-source voltage VDS and the turn-on threshold Vth_on, on the premise that the primary switch state indicating signal PON indicates an on state of the primary switch P1, the on-control circuit 33 provides a synchronous on signal ST to control an on operation of the synchronous rectifier P2 based on a comparison result of the drain-source voltage VDS and the turn-on threshold Vth_on. In some embodiment, the turn-on threshold Vth_on has a value smaller than but close to zero, e.g., −100 mV.

As shown in FIG. 3, the synchronous rectifier control circuit 30 further comprises an off-control circuit 34, configured to receive the drain-source voltage VDS and an turn-off threshold Vth_off, the off-control circuit 34 provides a synchronous off signal RT to turn off the synchronous rectifier P2 when the drain-source voltage VDS increases to the turn-off threshold Vth_off; and a driving circuit 35, configured to receive the synchronous on signal ST and the synchronous off signal RT, and to provide a synchronous control signal G2 to control the synchronous rectifier P2 based on the synchronous on signal ST and the synchronous off signal RT. The turn-off threshold Vth_off has a value near zero. In some embodiments, the turn-off threshold Vth_off has a value of −50 mV.

In FIG. 3, the drain-source threshold setting circuit 31 samples and holds the value of the drain-source voltage VDS, and then provides the dynamic drain-source voltage threshold Vdref having the value of or part of the drain-source voltage VDS. The primary switch detecting circuit 32 receives the dynamic drain-source voltage threshold Vdref and the drain-source voltage VDS. If the drain-source voltage VDS is larger than the dynamic drain-source voltage threshold Vdref for a preset time period, the primary switch state indicating signal PON becomes valid and indicates that the primary switch P1 is in the on state, which is the premise before turning on the synchronous rectifier. The valid state of the primary switch state indicating signal PON will be maintained until the secondary rectifier P2 is on. In one embodiment, the synchronous on signal ST is applied to reset the primary switch detecting circuit 32 and clear the valid state of the primary switch state indicating signal PON when the synchronous rectifier P2 is turned on. It should be understood that the sampled and hold drain-source voltage VDS obtained during a current switching cycle is applied as the dynamic drain-source voltage threshold Vdref during a next switching cycle, wherein a switching cycle could be defined as a time period from the time the primary switch is turned on to the time the primary switch is turned on again. In some embodiments, the value of the dynamic drain-source voltage threshold Vdref is set to be proportional to a maximum value of the drain-source voltage VDS, e.g., Vdref=VDS(max)×90%, wherein VDS(max) is the maximum value of the drain-source voltage VDS (drain-source voltage value during the primary switch is on, not spikes). The proportional coefficient between the dynamic drain-source voltage threshold Vdref and the drain-source voltage VDS may be varied according to different application requirement, and may be accomplished by a voltage divider. The drain-source voltage VDS is compared with the dynamic drain-source voltage threshold Vdref which reflects the value of the drain-source voltage VDS of the previous switching cycle to generate the primary switch state indicating signal PON. If VDS>Vdref, the primary switch state indicating signal PON is valid, which indicates that the primary switch P1 is on. The primary switch state indicating signal PON is reset and updated in every switching cycle. The primary switch state indicating signal PON could be reset by the synchronous on signal ST, the synchronous off signal RT, the synchronous control signal G2 or other signals which could reflect the operation of the primary switch P1 or the synchronous rectifier P2.

In some embodiments, the voltage across the synchronous rectifier P2 is very large, maybe tens of volts. In this situation, the drain-source voltage VDS in FIG. 3 represents a divided voltage of the real voltage across the synchronous rectifier P2. In these embodiments, the threshold voltages corresponding to the drain-source voltage VDS are adjusted accordingly.

The on-control circuit 33 receives the primary switch state indicating signal PON, the drain-source voltage VDS and the turn-on threshold Vth_on. On the premise that the primary switch state indicating signal PON indicates an on state of the primary switch P1, the on-control circuit 33 provides the synchronous on signal ST to turn on the synchronous rectifier P2 when the drain-source voltage VDS decreases to the turn-on threshold Vth_on.

The off-control circuit 34 receives the drain-source voltage VDS and the turn-off threshold Vth_off, and provides the synchronous off signal RT to turn off the synchronous rectifier P2 when the drain-source voltage VDS increases to the turn-off threshold Vth_off.

The driving circuit 35 receives the synchronous on signal ST and the synchronous off signal RT, and provides the synchronous control signal G2 to control the synchronous rectifier P2. In one embodiment, when the synchronous on signal ST indicates to turn on the synchronous rectifier P2, the synchronous control signal G2 has a high voltage level, and when the synchronous off signal RT indicates to turn off the synchronous rectifier P2, the synchronous control signal G2 has a low voltage level. It should be understood that, the driving circuit 35 could comprise any logic circuit with the function described in the preset invention, and the signal forms of the input and output signals of the driving circuit 35 could vary according to the application requirements.

Figure 4:
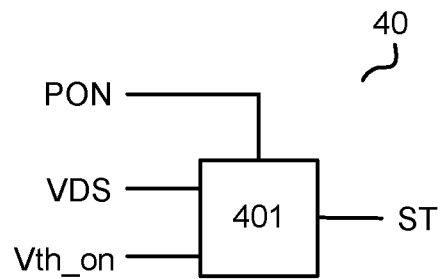
FIG. 4 schematically shows an on-control circuit 40 in accordance with an embodiment of the present invention.

FIG. 4 schematically shows an on-control circuit 40 in accordance with an embodiment of the present invention. As shown in FIG. 4, the on-control circuit 40 comprises a comparison circuit 401, having an enable terminal configured to receive the primary switch state indicating signal PON, a first input terminal configured to receive the drain-source voltage VDS, a second input terminal configured to receive the turn-on threshold Vth_on, and an output terminal configured to provide the synchronous on signal ST. When the primary switch state indicating signal PON indicates that the primary switch P1 is on, the comparison circuit 401 is enabled to compare the drain-source voltage VDS with the turn-on threshold Vth_on. If the drain-source voltage VDS drops to the turn-on threshold Vth_on, the synchronous on signal ST flips to be valid to turn on the synchronous rectifier P2. It should be understood that, the on-control circuit 40 in FIG. 4 is just for illustration. Persons of ordinary skill in the art could use other circuits to perform the similar function. In some embodiments, the primary switch state indicating signal PON is not used as an enable signal, instead, the primary switch state indicating signal PON is logically operated with the synchronous on signal ST, and the operation result is provided to control the on operation of the synchronous rectifier P2.

Figure 5:
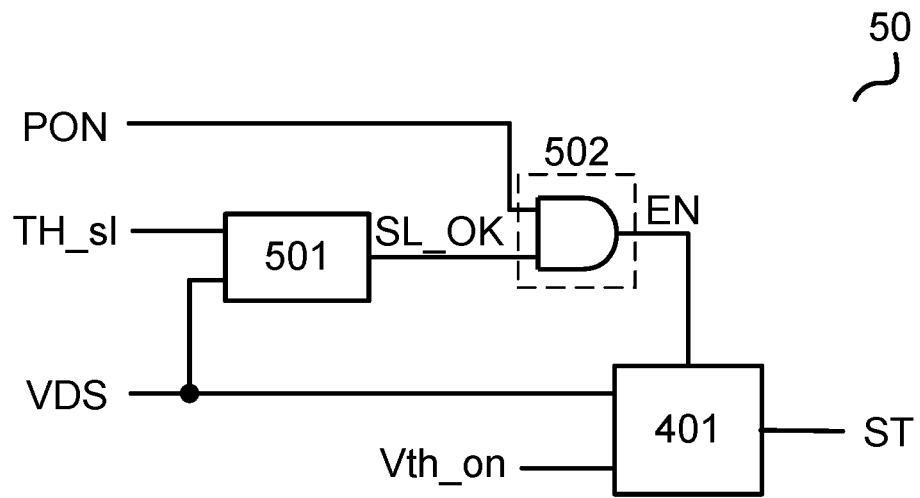
FIG. 5 schematically shows an on-control circuit 50 in accordance with an embodiment of the present invention.

FIG. 5 schematically shows an on-control circuit 50 in accordance with an embodiment of the present invention. As shown in FIG. 5, the on-control circuit 50 comprises: a slew rate detecting circuit 501, having a first input terminal configured to receive the drain-source voltage VDS, a second input terminal configured to receive a slew rate threshold TH_sl, and an output terminal configured to provide a drain-source voltage slew rate indicating signal SL_OK; an turn-on logic circuit 502, having a first input terminal configured to receive the primary switch state indicating signal PON, a second input terminal configured to receive the drain-source voltage slew rate indicating signal SL_OK, and an output terminal configured to provide an enable signal EN; and the comparison circuit 401, having the enable terminal configured to receive the enable signal EN, the first input terminal configured to receive the drain-source voltage VDS, the second input terminal configured to receive the turn-on threshold Vth_on, and the output terminal configured to provide the synchronous on signal ST. In the embodiment of FIG. 5, when a slew rate of the drain-source voltage VDS reaches the slew rate threshold TH_sl, the slew rate detecting circuit 501 sets the drain-source voltage slew rate indicating signal SL_OK valid. The turn-on logic circuit 502 receives the drain-source voltage slew rate indicating signal SL_OK and the primary switch state indicating signal PON, when the drain-source voltage slew rate indicating signal SL_OK is valid, which means the slew rate of the drain-source voltage VDS is higher than the slew rate threshold TH_sl, and the primary switch state indicating signal PON indicates that the primary switch is on, the turn-on logic circuit 502 sets the enable signal EN valid to enable the comparison circuit 401. Then the drain-source voltage VDS is compared with the turn-on threshold Vth_on. When the drain-source voltage VDS drops to the turn-on threshold Vth_on, the synchronous on signal ST turns on the synchronous rectifier P2.

Figure 6:
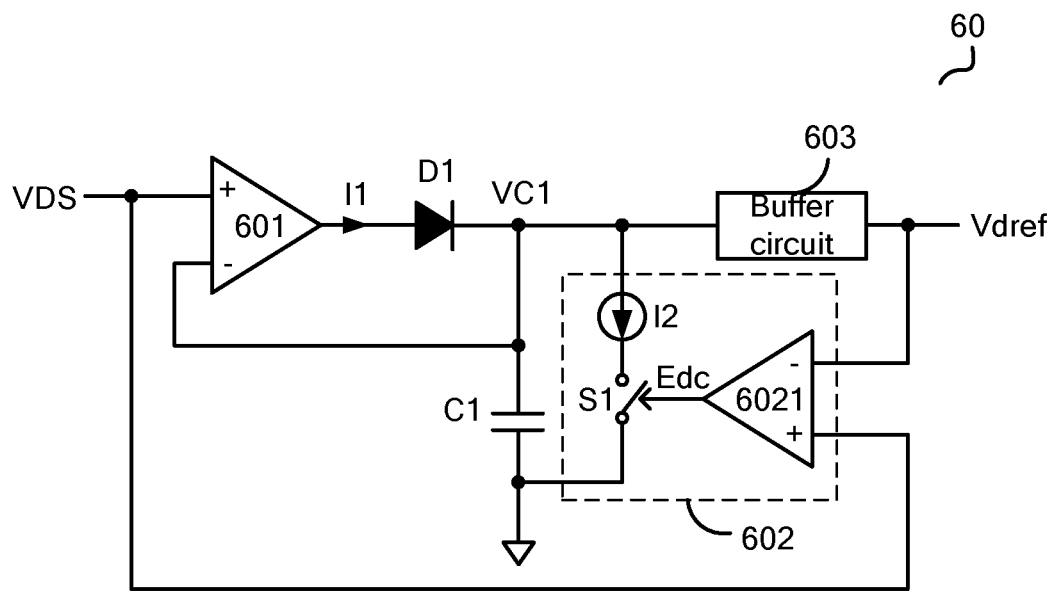
FIG. 6 schematically shows a drain-source threshold setting circuit 60 in accordance with an embodiment of the present invention.

FIG. 6 schematically shows a drain-source threshold setting circuit 60 in accordance with an embodiment of the present invention. As shown in FIG. 6, the drain-source threshold setting circuit 60 comprises: a capacitor C1; an amplifier 601, configured to receive the drain-source voltage VDS and a capacitor voltage VC1 across the capacitor C1, and to provide a first current I1 to charge the capacitor C1 based on an amplified error between the drain-source voltage VDS and the capacitor voltage VC1; a buffer circuit 603, configured to receive the capacitor voltage VC1, and to provide the dynamic drain-source voltage threshold Vdref based on the capacitor voltage VC1; and a discharging circuit 602, configured to receive the drain-source voltage VDS and the dynamic drain-source voltage threshold Vdref, and to discharge the capacitor C1 based on a comparison result of the drain-source voltage VDS and the dynamic drain-source voltage threshold Vdref.

In FIG. 6, when the drain-source voltage VDS increases, the first current I1 provided by the amplifier 601 increases, and charges the capacitor C1, until the drain-source voltage VDS reaches a maximum value, i.e., VC1=VDS. The dynamic drain-source voltage threshold Vdref equals to the maximum value of the drain-source voltage VDS, or partial of the maximum value. The buffer circuit 603 is configured for isolation and adjusting the output resistance of the drain-source threshold setting circuit 60, and is not necessary in some embodiments. A diode D1 is configured between the output terminal of the amplifier 601 and the capacitor C1 to prevent reverse current from the capacitor C1 to the amplifier 601. In some embodiments, the diode D1 could be omitted.

In some embodiments, the input voltage VIN shown in FIG. 1 is a rectified AC voltage. In an AC line voltage switching cycle, the AC voltage changes with a sine wave, which means the input voltage VIN changes with a half sine wave. The drain-source voltage VDS and the input voltage VIN has a relationship of: VDS=VIN/N+VOUT, wherein N is a turns ratio of the primary winding to the secondary winding of the transformer T1. That means the drain-source voltage VDS varies with the input voltage VIN.

To make the dynamic drain-source voltage threshold Vdref follow the drain-source voltage VDS, the drain-source threshold setting circuit 60 comprises the discharging circuit 602 to discharge the capacitor C1 to decrease the dynamic drain-source voltage threshold Vdref when the drain-source voltage VDS decreases. In the embodiment of FIG. 6, the discharging circuit 602 comprises a current source I2 and a switch S1 coupled in series, and a first comparator 6021 providing an output signal to control the switch S1. The first comparator 6021 has a first input terminal configured to receive the drain-source voltage VDS, a second input terminal configured to receive the dynamic drain-source voltage threshold Vdref, and an output terminal configured to provide an output signal Edc based on a comparison result of the drain-source voltage VDS and the dynamic drain-source voltage threshold Vdref. In some embodiments, the capacitor voltage VC1 instead of the dynamic drain-source voltage threshold Vdref is provided to the second input terminal of the first comparator 6021. It should be understood that a voltage proportional to the dynamic drain-source voltage threshold Vdref, i.e., K×Vdref, could be used to replace the dynamic drain-source voltage threshold Vdref to be provided to the first comparator 3021, wherein K≥1. When the drain-source voltage VDS is lower than the dynamic drain-source voltage threshold Vdref, or is lower than the voltage proportional to the dynamic drain-source voltage threshold Vdref, the output signal Edc is valid and turns on the switch S1, and then the second current source I2 discharges the capacitor C1. In most applications, the maximum values of the drain-source voltage VDS (drain-source voltage value during the primary switch is on, not spikes) of the adjacent switching cycles are close, which means only small adjustment to the dynamic drain-source voltage threshold Vdref is needed. Thus, the current provided by the second current source I2 is small. Persons of ordinary skill in the art could set the current of the second current source I2 according to the real application requirement.

In some embodiment, the input voltage VIN changes significantly, e.g., during line regulation, the input voltage VIN may has a transient from high to low. Consequently, the drain-source voltage VDS has a transient too. If the drain-source voltage VDS drops suddenly, but the dynamic drain-source voltage threshold Vdref could not be refreshed timely, then the drain-source voltage VDS could not reach the dynamic drain-source voltage threshold Vdref for a long time. That is to say, even the primary switch P1 is normally on, the primary switch state indicating signal PON would indicate that the primary switch P1 is off, which may block the on operation of the synchronous rectifier when it should be on.

Figure 7:
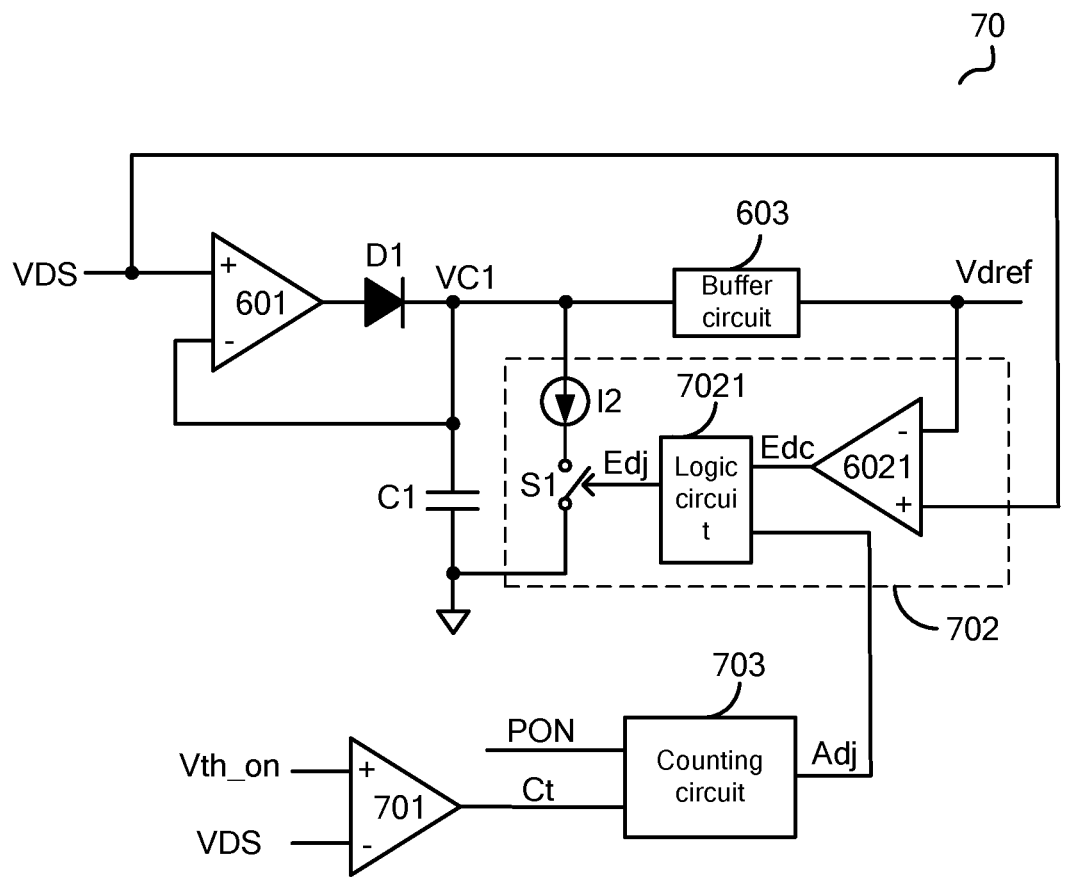
FIG. 7 schematically shows a drain-source threshold setting circuit 70 in accordance with an embodiment of the present invention.

To solve the above mentioned problem, FIG. 7 schematically shows a drain-source threshold setting circuit 70 in accordance with an embodiment of the present invention. As shown in FIG. 7, the drain-source threshold setting circuit 70 comprises: the capacitor C1; the amplifier 601, configured to receive the drain-source voltage VDS and the capacitor voltage VC1 across the capacitor C1, and to provide the first current I1 to charge the capacitor C1 based on the amplified error between the drain-source voltage VDS and the capacitor voltage VC1; the buffer circuit 603, configured to receive the capacitor voltage VC1, and to provide the dynamic drain-source voltage threshold Vdref based on the capacitor voltage VC1; a second comparator 701, configured to receive the turn-on threshold Vth_on and the drain-source voltage VDS, and to provide a counting signal Ct based on a comparison result of the turn-on threshold Vth_on and the drain-source voltage VDS; a counting circuit 703, configured to receive the counting signal Ct and the primary switch state indicating signal PON, and to provide a threshold regulating signal Adj based on the counting signal Ct and the primary switch state indicating signal PON; and a discharging circuit 702, configured to receive the drain-source voltage VDS, the dynamic drain-source voltage threshold Vdref and the threshold regulating signal Adj, and to discharge the capacitor C1 based on the drain-source voltage VDS, the dynamic drain-source voltage threshold Vdref and the threshold regulating signal Adj. In the embodiment of FIG. 7, every time when the drain-source voltage VDS decreases to the turn-on threshold Vth_on, the counting signal Ct flips from the low voltage level to the high voltage level. The counting circuit 703 counts the rising edge of the counting signal Ct. When the counting circuit 703 counts to a preset number, the threshold regulating signal Adj controls the discharging circuit 702 to discharge the capacitor C1. The counting circuit 703 is reset when the primary switch state indicating signal PON indicates that the drain-source voltage VDS is larger than the dynamic drain-source voltage threshold Vdref.

Compared with the discharging circuit 602 in FIG. 6, the discharging circuit 702 in FIG. 7 further comprises a logic circuit 7021. The logic circuit 7021 may be an AND gate, an OR gate, a flip-flop or any other applicable logic circuit, depending on the logic states of the output signal Edc of the first comparator 6021 and the threshold regulating signal Adj. In one embodiment, a discharging control signal Edj is provided to turn on the switch S1 to discharge the capacitor C1 when any one of the output signal Edc and the threshold regulating signal Adj is valid.

Figure 8:
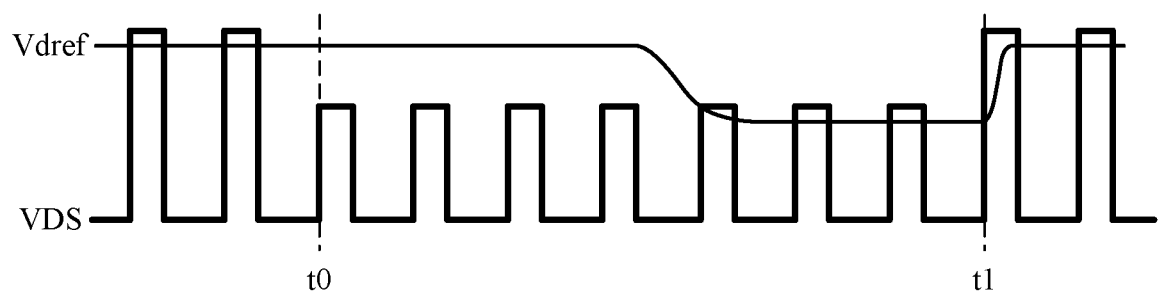
FIG. 8 schematically show the waveforms of the drain-source voltage VDS and the dynamic drain-source voltage threshold Vdref in accordance with an embodiment of the present invention.

FIG. 8 schematically show the waveforms of the drain-source voltage VDS and the dynamic drain-source voltage threshold Vdref in accordance with an embodiment of the present invention. When the synchronous rectifier control circuit 30 adopts the drain-source threshold setting circuit 70 in FIG. 7, the drain-source voltage VDS and the dynamic drain-source voltage threshold Vdref of the synchronous rectifier control circuit 30 has waveforms shown in FIG. 8. In FIG. 8, the drain-source voltage VDS has a transient from high to low at time t0. During the four switching cycles after time t0, the drain-source voltage VDS keeps lower than the dynamic drain-source voltage threshold Vdref. Then the counting circuit 703 counts these four switching cycles, and provides the threshold regulating signal Adj to control the discharging circuit 702 to discharge the capacitor C1. As a result, the dynamic drain-source voltage threshold Vdref decreases. In the fifth switching cycle, the drain-source voltage VDS becomes higher than the decreased dynamic drain-source voltage threshold Vdref, then the primary switch state indicating signal PON is valid, and resets the counting circuit 703. After that, the threshold regulating signal Adj is invalid, and the discharging circuit 702 stops discharging the capacitor C1. At time t1, the drain-source voltage VDS increases, then the amplifier 601 charges capacitor C1, and the dynamic drain-source voltage threshold Vdref increases again.

As can be seen from FIG. 8, the counting circuit 703 provides the threshold regulating signal Adj to start the discharging process of the capacitor C1 after 4 times that the drain-source voltage VDS fails to reach the dynamic drain-source voltage threshold Vdref. In real application, the maximum counting number of the counting circuit 703 could be set according to the application requirement.

Figure 9:
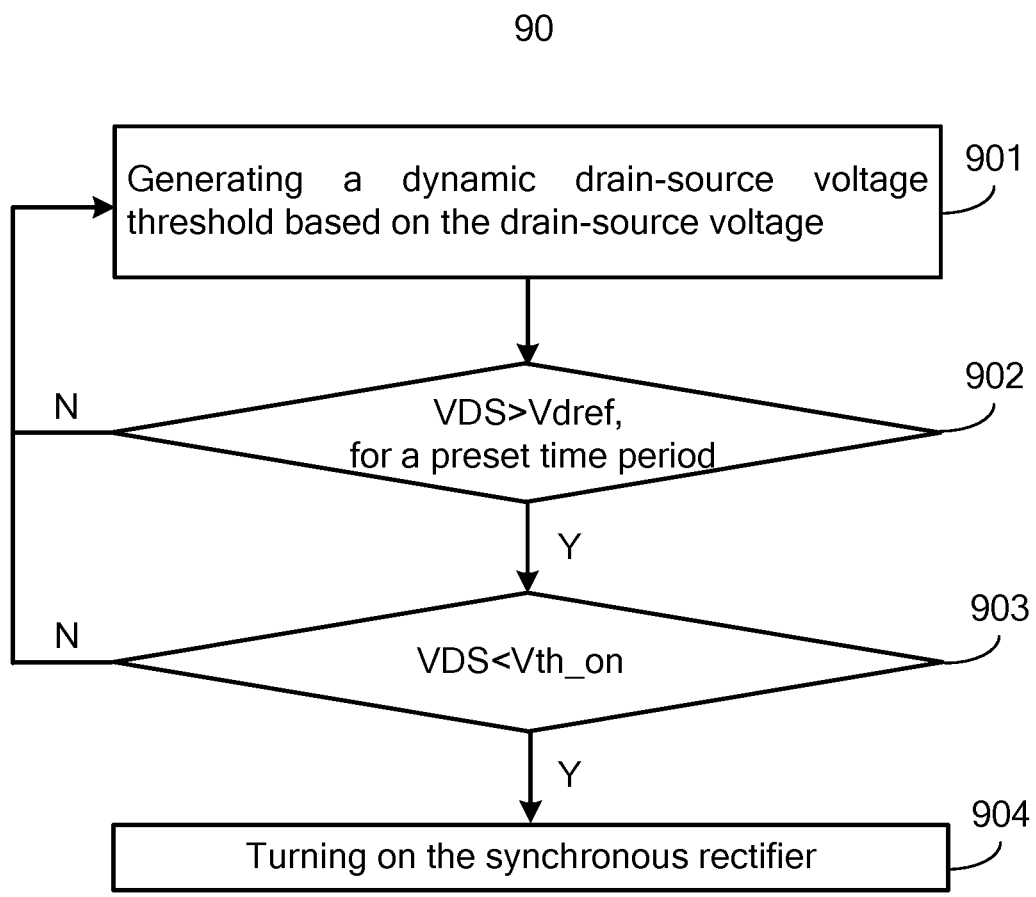
FIG. 9 schematically shows a control method 90 for controlling a synchronous rectifier in a synchronous rectification circuit in accordance with an embodiment of the present invention.

FIG. 9 schematically shows a control method 90 for controlling a synchronous rectifier of a synchronous rectification circuit in accordance with an embodiment of the present invention. The synchronous rectification circuit further comprises a primary switch. The primary switch and the synchronous rectifier are turned on and off alternately to convert an input voltage VIN to an output voltage VOUT. The control method 90 comprises:

Step 901, generating a dynamic drain-source voltage threshold Vdref based on the drain-source voltage VDS;

Step 902, determining if the primary switch is in an on state by comparing the drain-source voltage VDS with the dynamic drain-source voltage threshold Vdref;

Step 903, detecting if the drain-source voltage VDS is lower than a turn-on threshold Vth_on; and Step 904, after the drain-source voltage VDS reaches the dynamic drain-source voltage threshold Vdref, turning on the synchronous rectifier when the drain-source voltage VDS is lower than the turn-on threshold Vth_on.

In one embodiment, the control method 90 further comprises step 905, turning off the synchronous rectifier when the drain-source voltage VDS is higher than a turn-off threshold Vth_off.

In one embodiment, the control method 90 further comprises step 906, detecting a slew rate of the drain-source voltage VDS, and turning on the synchronous rectifier on the premise that the slew rate of the drain-source voltage VDS is higher than a slew rate threshold.

In one embodiment, the step 901 comprises:

Step 9011, sampling the drain-source voltage VDS, keeping the sampled value by a capacitor, and taking partial of a voltage across the capacitor as the dynamic drain-source voltage threshold Vdref; and Step 9012, discharging the capacitor when the drain-source voltage VDS is lower than the voltage across the capacitor.

In one embodiment, the step 901 further comprises:

Step 9013, counting the number of continuous switching cycles in which the drain-source voltage VDS fails to reach the dynamic drain-source voltage threshold Vdref;

Step 9014, discharging the capacitor when the number of the continuous switching cycles in which the drain-source voltage VDS fails to reach the dynamic drain-source voltage threshold Vdref reaches a preset number; and Step 9015, clearing the counted number once the drain-source voltage VDS is higher than a reset threshold.

In one embodiment, the reset threshold equals to the dynamic drain-source voltage threshold Vdref.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously would be resorted to by those skilled in the art without departing from the spirit and the scope of the invention as hereinafter defined by the appended claims as only a preferred embodiment(s) thereof has been disclosed.

What is claimed is:

1. A drain-source threshold setting circuit to control a synchronous rectifier, comprising:
   a capacitor;
   an amplifier, configured to receive a drain-source voltage across the synchronous rectifier and a capacitor voltage across the capacitor, and to provide a first current to charge the capacitor based on an amplified error between the drain-source voltage and the capacitor voltage;
   a buffer circuit, configured to receive the capacitor voltage, and to provide a dynamic drain-source voltage threshold based on the capacitor voltage; and
   a discharging circuit, configured to receive the drain-source voltage and the dynamic drain-source voltage threshold, and to discharge the capacitor based on a comparison result of the drain-source voltage and the dynamic drain-source voltage threshold.

2. The drain-source threshold setting circuit of claim 1, wherein the discharging circuit comprises:
   a first comparator, configured to receive the drain-source voltage and the dynamic drain-source voltage threshold, and to provide an output signal based on a comparison result of the drain-source voltage and the dynamic drain-source voltage threshold;
   a current source; and
   a switch, coupled in series with the current source, wherein the series coupled current source and switch are coupled in parallel with the capacitor, and wherein the switch is controlled by the output signal of the first comparator.

3. The drain-source threshold setting circuit of claim 1, further comprising:
   a second comparator, configured to receive a turn-on threshold and the drain-source voltage, and to provide a counting signal based on a comparison result of the turn-on threshold and the drain-source voltage; and
   a counting circuit, configured to receive the counting signal and a primary switch state indicating signal indicating an on state of a primary switch of a synchronous rectification circuit, and to provide a threshold regulating signal based on the counting signal and the primary switch state indicating signal; wherein
   the discharging circuit further receives the threshold regulating signal, and discharges the capacitor based on the drain-source voltage, the dynamic drain-source voltage threshold and the threshold regulating signal; and wherein
   the counting signal becomes valid every time the drain-source voltage decreases to the turn-on threshold, and the counting circuit counts every time the counting signal becomes valid, and the threshold regulating signal controls the discharging circuit to discharge the capacitor when the counting circuit counts to a preset number.

4. The drain-source threshold setting circuit of claim 3, wherein the discharging circuit comprises:
   a first comparator, configured to receive the drain-source voltage and the dynamic drain-source voltage threshold, and to provide an output signal based on a comparison result of the drain-source voltage and the dynamic drain-source voltage threshold;
   a logic circuit, configured to receive the output signal of the first comparator and the threshold regulating signal, and to provide a discharging control signal based on the output signal of the first comparator and the threshold regulating signal;
   a current source; and
   a switch, coupled in series with the current source, wherein the series coupled current source and switch are coupled in parallel with the capacitor, and wherein the switch is controlled by the discharging control signal.

5. A synchronous rectifier control circuit, used with a synchronous rectification circuit having a primary switch and a synchronous rectifier, comprising:

a drain-source threshold setting circuit, configured to receive a drain-source voltage across the synchronous rectifier, and to provide a dynamic drain-source voltage threshold based on the drain-source voltage;

a primary switch detecting circuit, configured to receive the drain-source voltage and the dynamic drain-source voltage threshold, and to provide a primary switch state indicating signal based on a comparison result of the drain-source voltage and the dynamic drain-source voltage threshold; and an on-control circuit, configured to receive the primary switch state indicating signal, the drain-source voltage and a turn-on threshold, on the premise that the primary switch state indicating signal indicates an on state of the primary switch, the on-control circuit provides a synchronous on signal to turn on the synchronous rectifier when the drain-source voltage decreases to the turn-on threshold.

6. The synchronous rectifier control circuit of claim 5, wherein the drain-source threshold setting circuit comprises:
a capacitor;
an amplifier, configured to receive the drain-source voltage and a capacitor voltage across the capacitor, and to provide a first current to charge the capacitor based on an amplified error between the drain-source voltage and the capacitor voltage;
a buffer circuit, configured to receive the capacitor voltage, and to provide the dynamic drain-source voltage threshold based on the capacitor voltage; and
a discharging circuit, configured to receive the drain-source voltage and the dynamic drain-source voltage threshold, and to discharge the capacitor based on a comparison result of the drain-source voltage and the dynamic drain-source voltage threshold.

7. The synchronous rectifier control circuit of claim 6, wherein the discharging circuit comprises:
a first comparator, configured to receive the drain-source voltage and the dynamic drain-source voltage threshold, and to provide an output signal based on a comparison result of the drain-source voltage and the dynamic drain-source voltage threshold;
a current source; and
a switch, coupled in series with the current source, wherein the series coupled current source and switch are coupled in parallel with the capacitor, and wherein the switch is controlled by the output signal of the first comparator.

8. The synchronous rectifier control circuit of claim 6, wherein the drain-source threshold setting circuit further comprises:
a second comparator, configured to receive the turn-on threshold and the drain-source voltage, and to provide a counting signal based on a comparison result of the turn-on threshold and the drain-source voltage; and
a counting circuit, configured to receive the counting signal and the primary switch state indicating signal, and to provide a threshold regulating signal based on the counting signal and the primary switch state indicating signal; wherein
the discharging circuit further receives the threshold regulating signal, and discharges the capacitor based on the drain-source voltage, the dynamic drain-source voltage threshold and the threshold regulating signal; and wherein
the counting signal becomes valid every time the drain-source voltage decreases to the turn-on threshold, and the counting circuit counts every time the counting signal becomes valid, and the threshold regulating signal controls the discharging circuit to discharge the capacitor when the counting circuit counts to a preset number.

9. The synchronous rectifier control circuit of claim 8, wherein the discharging circuit comprises:
a first comparator, configured to receive the drain-source voltage and the dynamic drain-source voltage threshold, and to provide an output signal based on a comparison result of the drain-source voltage and the dynamic drain-source voltage threshold;
a logic circuit, configured to receive the output signal of the first comparator and the threshold regulating signal, and to provide a discharging control signal based on the output signal of the first comparator and the threshold regulating signal;
a current source; and
a switch, coupled in series with the current source, wherein the series coupled current source and switch are coupled in parallel with the capacitor, and wherein the switch is controlled by the discharging control signal.

10. The synchronous rectifier control circuit of claim 5, further comprising:
an off-control circuit, configured to receive the drain-source voltage and a turn-off threshold, and to provide a synchronous off signal to turn off the synchronous rectifier when the drain-source voltage increases to the turn-off threshold.

11. The synchronous rectifier control circuit of claim 10, wherein the turn-on threshold is lower than the turn-off threshold.

12. The synchronous rectifier control circuit of claim 10, further comprising:
a driving circuit, configured to receive the synchronous on signal and the synchronous off signal, and to provide a synchronous control signal to control the synchronous rectifier based on the synchronous on signal and the synchronous off signal.

13. A control method for controlling a synchronous rectifier of a synchronous rectification circuit, wherein the synchronous rectification circuit having a primary switch, the control method comprising:
generating a dynamic drain-source voltage threshold based on the drain-source voltage;
determining if the primary switch is in an on state by comparing the drain-source voltage with the dynamic drain-source voltage threshold;
detecting if the drain-source voltage is lower than a turn-on threshold; and
after the drain-source voltage reaches the dynamic drain-source voltage threshold, turning on the synchronous rectifier when the drain-source voltage is lower than the turn-on threshold.

14. The control method of claim 13, further comprising:
turning off the synchronous rectifier when the drain-source voltage is higher than a turn-off threshold.

15. The control method of claim 14, wherein the turn-on threshold is lower than the turn-off threshold.

16. The control method of claim 13, further comprising:
detecting a slew rate of the drain-source voltage, and turning on the synchronous rectifier on the premise that the slew rate of the drain-source voltage is higher than a slew rate threshold.

17. The control method of claim 13, wherein generating the dynamic drain-source voltage threshold based on the drain-source voltage comprises:

sampling the drain-source voltage, keeping the sample drain-source voltage on a capacitor, and taking partial of a voltage across the capacitor as the dynamic drain-source voltage threshold; and discharging the capacitor when the drain-source voltage is lower than the voltage across the capacitor.

18. The control method of claim 17, wherein generating the dynamic drain-source voltage threshold based on the drain-source voltage further comprises:

counting a number of continuous switching cycles in which the drain-source voltage fails to reach the dynamic drain-source voltage threshold;

discharging the capacitor when the number of the continuous switching cycles in which the drain-source voltage fails to reach the dynamic drain-source voltage threshold reaches a preset number; and clearing the counted number once the drain source voltage is higher than a reset threshold.

19. The control method of claim 17, wherein the reset threshold equals to the dynamic drain-source voltage threshold.

* * * * *